(12) United States Patent
Schmitz

(10) Patent No.: US 9,545,135 B2
(45) Date of Patent: Jan. 17, 2017

(54) BADGE

(76) Inventor: Hannes Schmitz, Vienna (AT)

( * ) Notice: Subject to any disclaimer, the term of this patent is extended or adjusted under 35 U.S.C. 154(b) by 95 days.

(21) Appl. No.: 14/003,362

(22) PCT Filed: Mar. 12, 2012

(86) PCT No.: PCT/AT2012/050032
§ 371 (c)(1),
(2), (4) Date: Nov. 8, 2013

(87) PCT Pub. No.: WO2012/119177
PCT Pub. Date: Sep. 13, 2012

(65) Prior Publication Data
US 2014/0053435 A1    Feb. 27, 2014

(30) Foreign Application Priority Data

Mar. 10, 2011    (AT) .............................. GM132/2011 U

(51) Int. Cl.
G09F 3/16    (2006.01)
A44C 3/00    (2006.01)
F24D 3/10    (2006.01)
G09F 3/18    (2006.01)
G09F 3/20    (2006.01)
G09F 3/12    (2006.01)
G09F 3/06    (2006.01)
(Continued)

(52) U.S. Cl.
CPC ............. *A44C 3/001* (2013.01); *F24D 3/1066* (2013.01); *G09F 3/18* (2013.01); *G09F 3/185* (2013.01); *G09F 3/207* (2013.01); *A22C 17/10* (2013.01); *G09F 3/06* (2013.01); *G09F 3/12* (2013.01); *G09F 3/16* (2013.01); *G09F 2021/023* (2013.01)

(58) Field of Classification Search
CPC ................ G09F 3/16; G09F 3/06; G09F 1/04; G09F 3/12; A22C 17/10
USPC ...................................................... 40/1.5, 666
See application file for complete search history.

(56) References Cited

U.S. PATENT DOCUMENTS 3,557,478 A * 1/1971 Sitzberger ..................... 40/1.5
6,269,574 B1 * 8/2001 Sokolofski ..................... 40/668
6,393,686 B1 5/2002 Braunberger
(Continued)

FOREIGN PATENT DOCUMENTS

DE        8620247 U1    10/1986
DE        9212131 U1     1/1992
(Continued)

OTHER PUBLICATIONS

Int'l Search Report issued Jul. 16, 2012 in Int'l Application No. PCT/AT2012/050032.
(Continued)

Primary Examiner — Syed A Islam
(74) Attorney, Agent, or Firm — Panitch Schwarze Belisario & Nadel LLP

(57) ABSTRACT

A badge is provided having a lower part (1) including a fixing device (2), for example for fixing on an article of clothing, a support part (3) on which an information carrier (40) can be applied or placed, and a transparent cover part (41). The lower part (1) and support part (3) are connected to each other along the periphery of the parts. At least two of the lower part (1), the support part (3), the cover part (41), and the information carrier (40) are made of a material that is completely biodegradable.

13 Claims, 3 Drawing Sheets

(51) Int. Cl.
*A22C 17/10* (2006.01)
*G09F 21/02* (2006.01)

(56) References Cited

U.S. PATENT DOCUMENTS

2009/0145008 A1    6/2009  McKye
2009/0193693 A1    8/2009  Drake
2011/0289805 A1* 12/2011  McKye ........................... 40/1.5

FOREIGN PATENT DOCUMENTS

| | | |
|---|---|---|
| FR | 2885723 A1 | 11/2006 |
| GB | 2412365 A | 9/2005 |
| WO | 9635346 A1 | 11/1996 |
| WO | 9853984 A1 | 12/1998 |

OTHER PUBLICATIONS

Office Action issued Feb. 24, 2012 in AT Application No. 132/2011.
English translation of Int'l Preliminary Report on Patentability issued Sep. 10, 2013 in Int'l Application No. PCT/AT2012.050032.

\* cited by examiner

BADGE

CROSS-REFERENCE TO RELATED APPLICATIONS

This application is a Section 371 of International Application No. PCT/AT2012/050032, filed Mar. 12, 2012, which was published in the German language on Sep. 13, 2012, under International Publication No. WO 2012/119177 A1 and the disclosure of which is incorporated herein by reference.

BACKGROUND OF THE INVENTION

The present invention relates to a badge comprising a lower part, which comprises a device for fixing the badge on an item of clothing, for example a support part, on which an information carrier can be applied or placed, and a transparent cover part, the lower part and the support part being connected to each other along their peripheries.

So far, badges and buttons have mainly been manufactured from metal parts in combination with plastics, which—due to the short period of use of such badges at conferences, concerts, political events, etc.—often end up as waste, which is difficult to recycle after a short period of time.

Studies and experiments using wood plastic composites (WPC) for badges have already been carried out. Polypropylene, which is not biodegradable, was used as binder, which means that the disposal continued to be a problem. The proportion of polypropylene of these badges amounted to between 20 and 50%; the wood proportion of the WPC material consisted of coarse wood chippings.

BRIEF SUMMARY OF THE INVENTION

An object of the present invention thus consists in providing a badge of the above described type which allows for a resource-efficient production and an environmentally sound disposal.

Another object of the invention consists in providing an easily putrescible badge which can be assembled by means of a common button press machine.

According to the present invention, the above tasks are fulfilled by forming at least two parts selected from the lower part, the support part, the cover part, and the information carrier of a completely biodegradable material.

This makes it possible to dispose of the badge after its use by incinerating or composting it, without creating the need for additional energy for separating materials or recycling them, for example by melting or dissolving processes. As the badge of the invention consists of multiple parts, it is particularly advantageous to form as many of these parts as possible of a biologically degradable material.

The biologically degradable material may preferably comprise at least one polysaccharide, the polysaccharide being cellulose, starch, chitin, wood, grass, rice straw, corn, cotton, or the like. The above mentioned materials have been known for a long time as easily degradable, environmentally friendly materials.

In order to achieve a good compostability or combustibility, it may be provided that the lower part and/or the support part consist(s) of the biologically degradable material, the biologically degradable material containing a maximum of 70%, preferably 15% to 50%, of wood, preferably wood dust.

A further embodiment of the invention may provide that the lower part and the support part consist of a cellulose acetate produced from cotton and wood. This means that the lower part and the support part can be completely recycled.

Additionally, the lower part and/or the support part and/or the cover part may consist of the biologically degradable material, which may be injection-moldable in order to allow for producing the parts by means of injection molding processes.

In case it is possible to process the biologically degradable material in the form of injection-molding granules, manufacturing is particularly easy in suitable injection-molding devices.

According to another exemplary embodiment of the invention, the fixing device may be formed by a bracket, which is molded to the periphery of the bottom surface of the lower part and comprises a free end, and which extends spaced apart from the lower part, the free end of the bracket serving the purpose of pinning on the badge. By using an injection-moldable material, it becomes possible to implement the pin-on device when manufacturing the lower part. Alternatively, a metal pin, which is formed as part of the lower part, can be used; this way, the metal proportion of the badge of the invention can still be kept relatively low.

It is further possible that an elongated hole be formed along the direction in which the bracket extends and that the bracket have a concavely curved form, so that the distance between the bracket's middle section and the lower part is smaller than the distance between its free end and the lower part. This way it is possible to achieve a sufficiently strong clamping effect, for example when pinning the badge of the present invention onto an item of clothing, so that, due to its acting like a spring, the bracket, for example, pushes a cloth section into the elongated hole, thus better protecting the badge against accidentally slipping off.

The application of the badge of the invention, however, is not limited to pinning the badge onto items of clothing; the badge may also be pinned to any desired object, including shoes or electronic devices, for example.

In a further development of the invention, the lower part of the badge of the invention may have an essentially planar surface and a curved edge along its periphery for coupling engagement with the cover part.

Accordingly, in another embodiment of the invention, the support part may be shaped like a curved disc which additionally has a curved edge for coupling engagement with the lower part. By applying a pressing process an adequate transparent cover part can be clamped between the support part and the lower part, the cover part protecting the information carrier placed on the support part from outside influences.

According to a further embodiment of the invention, the badge may have an oval or polygonal surface, for example a circular, oval, square, hexagonal or octagonal surface.

Another variation of the invention may consist in that the badge, in particular its lower part and support part, is pressed by a button press machine.

To this end, the outer diameter $d_1$ of the lower part may be smaller than the inner diameter $d_2$ of the support part.

The lower part is dimensioned smaller than the support part, so that the cover part, and optionally the information carrier, may be inserted, preferably leaving a clearance, at the edge in the periphery between the lower part and the support part and that the lower part and the cover part are then pressed together.

It has turned out that the pressing process with a button press machine can be advantageously carried out when the lower part and the support part, which consist of the biologically degradable material, have different degrees of rigidity. After the pressing process, the support part is still concavely deformed in its edge area, the cover part remaining irremovably clamped between the support part and the lower part.

According to a preferred embodiment of the invention, a particularly advantageous compression can be achieved when the flexural elastic modulus of the lower part is higher than that of the support part; the flexural elastic modulus of the lower part may in particular be more than two times as high as that of the support part.

A further embodiment of the invention may consist in that the flexural elastic modulus of the support part ranges from 1500 MPa to 1900 MPa, particularly preferably amounting to 1700 MPa, and in that the flexural elastic modulus of the lower part ranges from 3800 MPa to 4200 MPa, particularly preferably amounting to 4000 MPa.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 6:
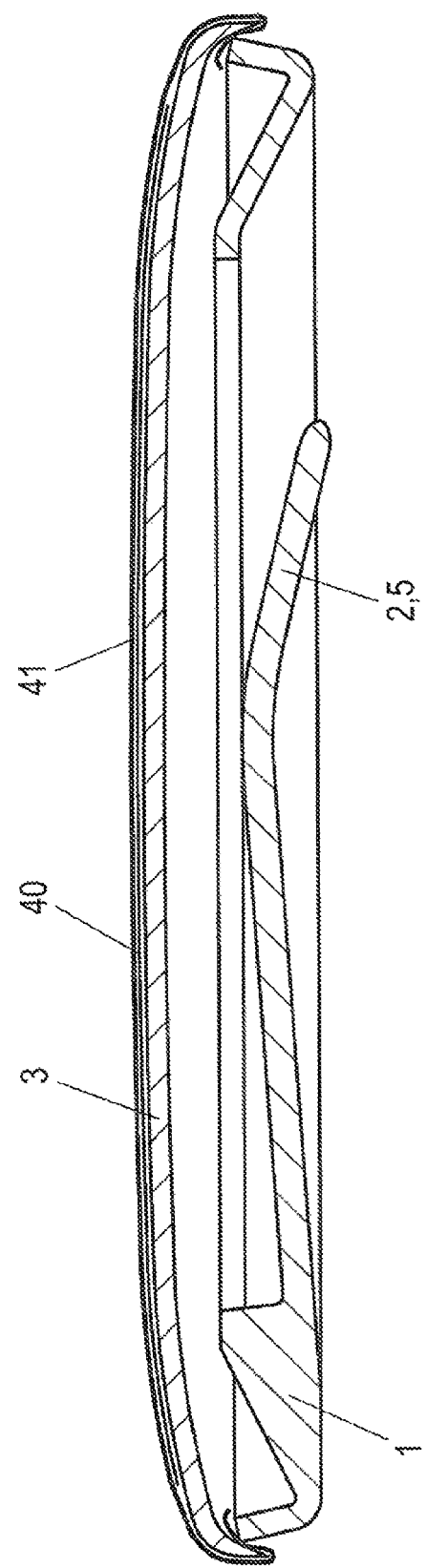
FIG. 6 is a cross-section through a badge which has not yet been compressed and consists of a lower part according to FIGS. 1 and 2 and a support part according to FIGS. 3, 4 and 5.

FIG. 6 shows an embodiment of a badge according to the invention which has already been assembled and essentially consists of a lower part 1, a fixing device 2, a support part 3, on which an information carrier 40 is placed, and a cover part 41, the lower part 1 and the support part 2 being connected to each other along their peripheries by a pressing process. At least two of the above mentioned parts are manufactured from a biologically degradable material.

Figure 1:
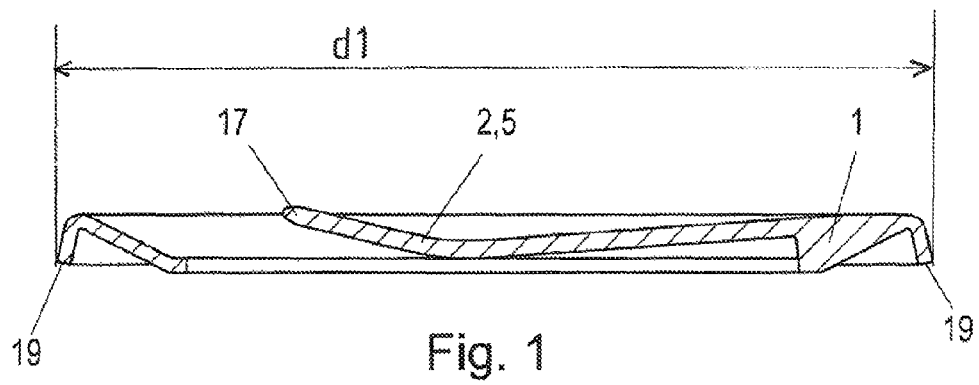
FIG. 1 is a cross-section A-A through an embodiment of a lower part of the badge of the invention shown in FIG. 2.
Figure 2:
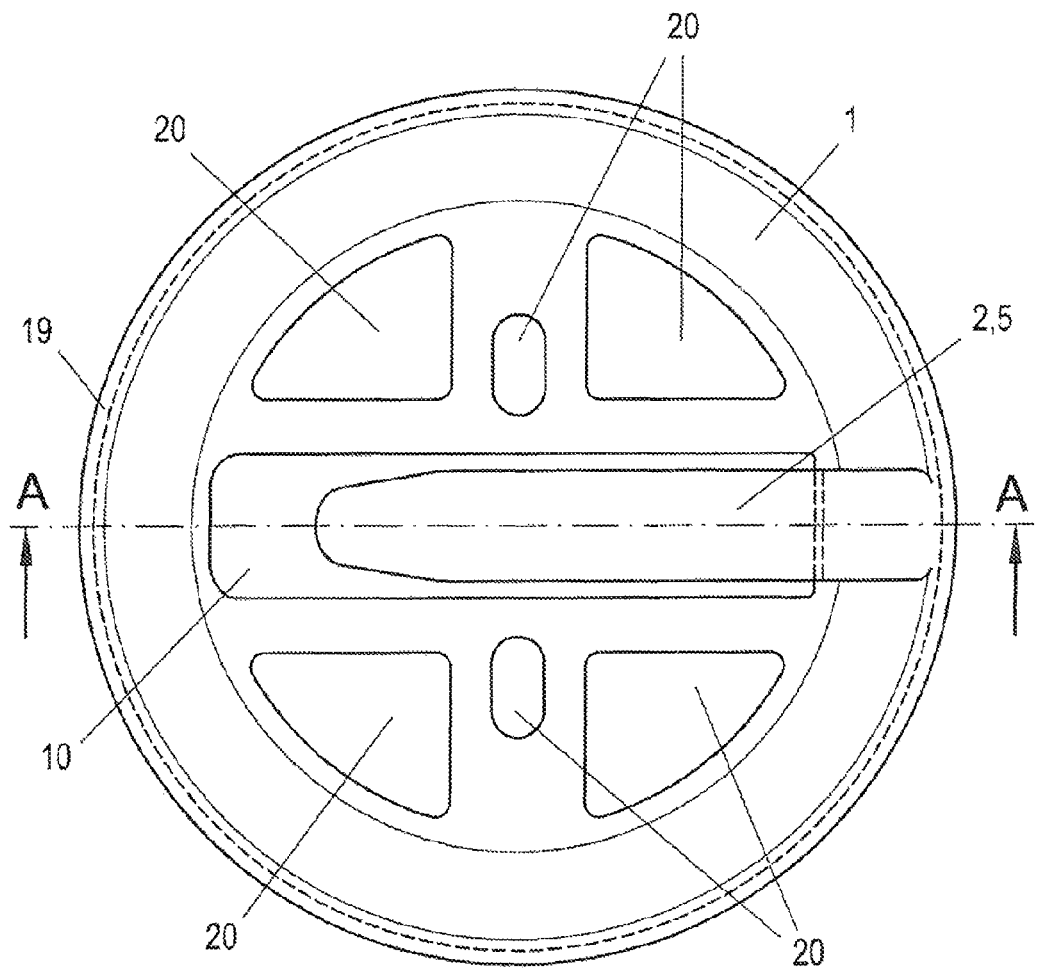
FIG. 2 is a bottom plan view of the lower part according to FIG. 1.

FIGS. 1 and 2 show the lower part 1 of the badge of the invention, the lower part consisting of a biologically completely degradable material which is preferably injection-moldable.

The degradable material preferably consists of a biopolymer, for example of a polysaccharide based on cellulose, starch, chitin, wood, grass, rice straw, corn, cotton, or the like.

The lower part 1 and/or the support part 3 preferably is/are formed of the biologically degradable material, which contains a maximum of 70%, preferably 15% to 50%, wood, preferably wood dust, which allows for a very environmentally friendly disposal.

Another biologically degradable material is a biopolymer based on a biologically degradable, aliphatic-aromatic co-polyester, being contained in the lower part 1 and/or the support part 3 at an amount of 25%, for example.

Further biopolymers, for example polylactic acid or polylactide, are also contained in the biologically degradable material of the lower part 1 and/or the support part 3.

According to another embodiment of the badge of the invention, the lower part 1 and the support part 3 consist of a cellulose acetate produced from cotton and wood.

It is, however, also possible to use any other biologically degradable material which is injection-moldable or processable in the form of injection-molded granules.

The fixing device 2 in form of a bracket 5 with a free end 17 is molded to the peripheral area of the bottom surface of the lower part 1, the bracket 5 extending spaced apart from the lower part 1, the free end 17 of the bracket 5 serving the purpose of pinning on the assembled badge.

An elongated hole 10 is formed in the lower part 1 along the direction in which the bracket 5 extends. The bracket 5 has a concavely curved form, the distance between its middle section and the lower part 1 being smaller than that between its free end 17 and the lower part 1.

Further holes 20 are provided next to the elongated hole 10, in order to allow for a relatively low weight of the lower part 1 while guaranteeing that the material is sufficiently thick.

It is possible to fix the badge using other means, such as safety pins, pins and snap-on clips, magnets, crocodile clips, etc.

Figure 4:
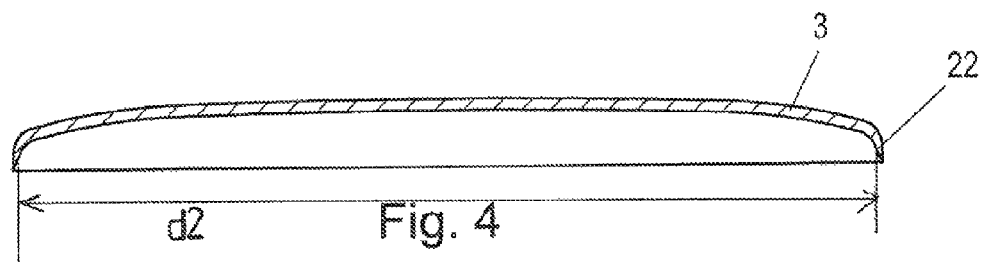
FIG. 4 is a cross-section A-A through the support part according to FIG. 3.
Figure 3:
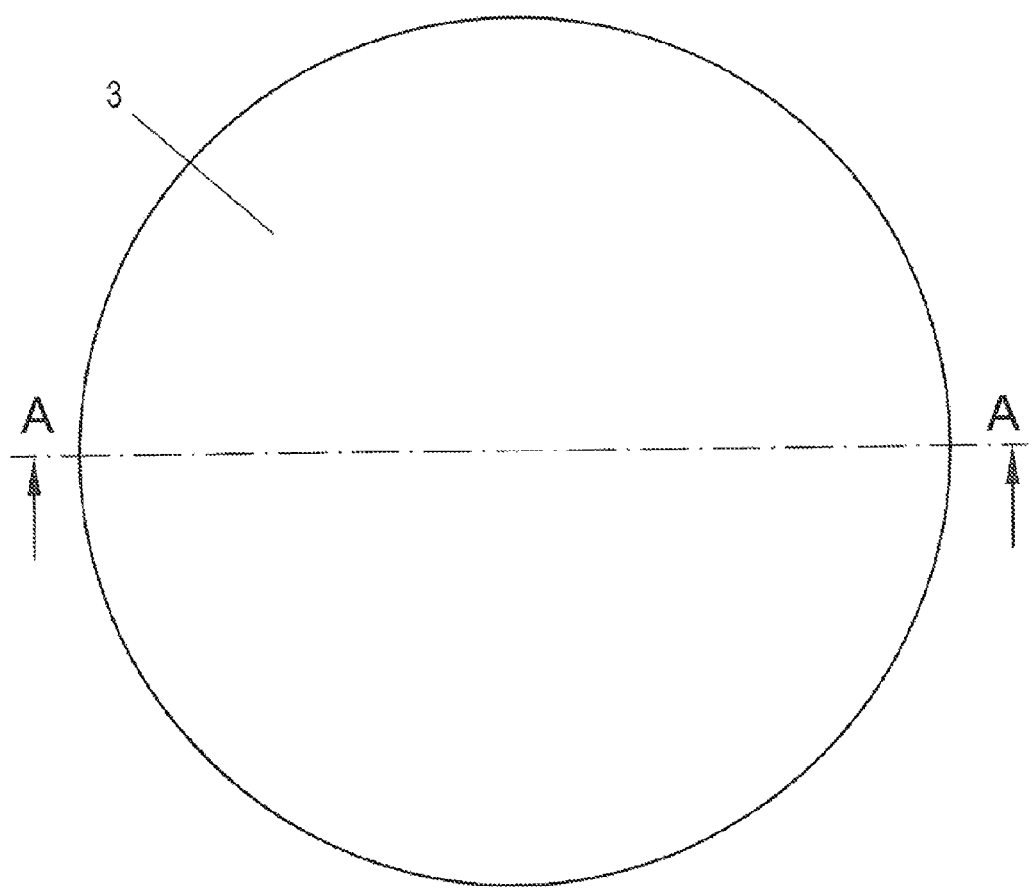
FIG. 3 is a top view of an embodiment of a support part of the badge of the invention.
Figure 5:
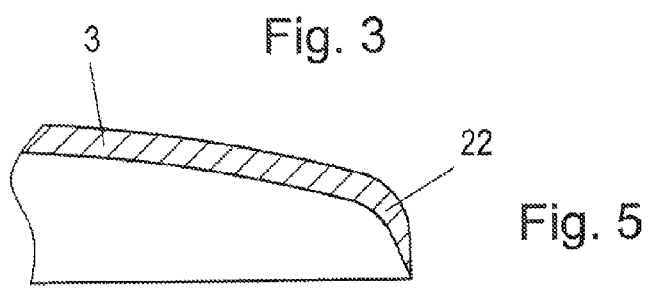
FIG. 5 is a broken-away detail view of the support part according to FIG. 3.

The lower part 1 is essentially planar and has a curved edge 19 along its periphery for coupling engagement with the support part 3, which is illustrated in the FIGS. 3, 4 and 5.

The support part 3 is made of a biologically degradable material and shaped like a curved disc which additionally has a curved edge 22 for coupling engagement with the lower part 1. The above mentioned injection-moldable materials, which can be used for the lower part 1, can also be used as biologically degradable material for the support part 3.

FIG. 6 shows a badge of the invention which has not yet been compressed and in which the lower part 1 is received in the support part 3 with a clearance. The cover part 41, in the form of a transparent film, is inserted at the curved edges of the lower part 1 and the support part 3. In this way an information carrier 40, in this case a printed paper strip, is held between the support part 3 and the cover part 41 and can be seen through the cover part 41. The paper strip may show a slogan or a logo or another message to be communicated by the badge.

The information carrier 40 may also be implemented as an imprint on the support part 3.

The above mentioned injection-moldable materials, which can be used for the lower part 1 and the support part 3, can also be used as biologically degradable material for the cover part 41.

The information carrier 40 is also made of a biologically degradable material, such as compostable paper which contains at least polysaccharide and/or polylactide components.

In order to make it possible to produce the badge of the invention using a known button press machine, the outer diameter d1 (FIG. 1) of the lower part 1 is smaller than the inner diameter d2 (FIG. 4) of the support part 3.

Thus d1<d2 applies.

The lower part 1 is particularly dimensioned smaller than the support part 3 so that the cover part 41 and optionally the information carrier 40 can be inserted at the edge between the lower part 1 and the support part 3 (in the sectional view in FIG. 6 at opposite points of the periphery), preferably leaving a clearance. In the pressing process the support part 3 is permanently deformed in the peripheral area in the direction of the periphery of the lower part 1, so that the cover part 41 and optionally the information carrier is/are clamped at the edge between the peripheries of the support part 3 and the lower part 1. In order to make a pressing process of this type possible, the lower part 1 and the support part 3, which, according to the invention, are made from a biologically degradable material, have different degrees of rigidity.

To this end, the flexural elastic modulus of the lower part 1 is higher than the flexural elastic modulus of the support part 3, the flexural elastic modulus of the lower part 1 being particularly preferably more than twice as high as that of the support part 3. The flexural elastic modulus of the support part 3 preferably ranges from 1500 MPa to 1900 MPa, particularly preferably amounting to 1700 MPa, and the flexural elastic modulus of the lower part 1 preferably ranges from 3800 MPa to 4200 MPa, particularly preferably amounting to 4000 MPa.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A badge comprising a lower part including a fixing device, a support part on which an information carrier is applied, and a transparent cover part, the lower part and the support part being connected along their respective peripheries, wherein at least the lower part and the support part are made of a completely biologically degradable material, and contain 15% to 50% of a wood proportion in a form of wood dust and 25% of a biopolymer based on a biologically degradable, aliphatic-aromatic co-polyester, wherein the lower part has a flexural elastic modulus more than twice as high as that of the support part, and wherein the lower part is essentially planar, comprises a rectangular hole under the fixing device, and has a curved edge along its periphery for coupling engagement with the support part and the support part is shaped like a curved disc and has a curved edge for coupling engagement with the lower part.

2. The badge according to claim 1, wherein the biologically degradable material is injection-moldable.

3. The badge according to claim 2, wherein the biologically degradable material can be processed in a form of injection-molded granules.

4. The badge according to claim 1, wherein the fixing device comprises a bracket, which is molded to a periphery of a bottom surface of the lower part and comprises a free end, and wherein the bracket extends spaced apart from the lower part and the free end of the bracket serves to pin the badge to a subject.

5. The badge according to claim 4, wherein the rectangular hole extends along a direction in which the bracket extends and wherein the bracket has a concavely curved shape, such that a distance between a middle section of the bracket and the lower part is smaller than a distance between the free end of the bracket and the lower part.

6. The badge according to claim 1, wherein the badge has a surface with a rounded or polygonal shape.

7. The badge according to claim 6, wherein the surface shape of the badge is selected from circular, oval, square, hexagonal, and octagonal.

8. The badge according to claim 1, wherein the badge is compressed by a button press machine.

9. The badge according to claim 1, wherein an outer diameter d1 of the lower part is smaller than an inner diameter d2 of the support part.

10. The badge according to claim 9, wherein the lower part is dimensioned smaller than the support part, such that the cover part may be inserted at an edge between the lower part and the support part.

11. The badge according to claim 10, wherein the lower part is dimensioned smaller than the support part, such that the information carrier may be inserted at the edge between the lower part and the support part.

12. The badge according to claim 1, wherein the flexural elastic modulus of the support part ranges from 1500 MPa to 1900 MPa, and the flexural elastic modulus of the lower part ranges from 3800 MPa to 4200 MPa.

13. The badge according to claim 12, wherein the flexural elastic modulus of the support part amounts to 1700 MPa, and the flexural elastic modulus of the lower part amounts to 4000 MPa.

\* \* \* \* \*